Feb. 23, 1932.    E. S. SMITH, JR    1,846,225
ROTARY LOW PRESSURE FLOW METER
Filed Jan. 7, 1929    2 Sheets-Sheet 1

INVENTOR
Ed S. Smith, Jr.
BY
Thomas A. Jaueler Jr.
ATTORNEY

Feb. 23, 1932.  E. S. SMITH, JR  1,846,225
ROTARY LOW PRESSURE FLOW METER
Filed Jan. 7, 1929    2 Sheets-Sheet 2
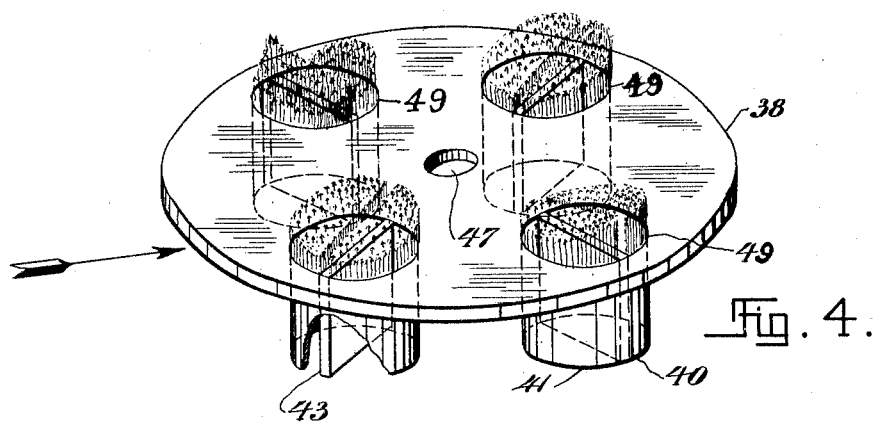
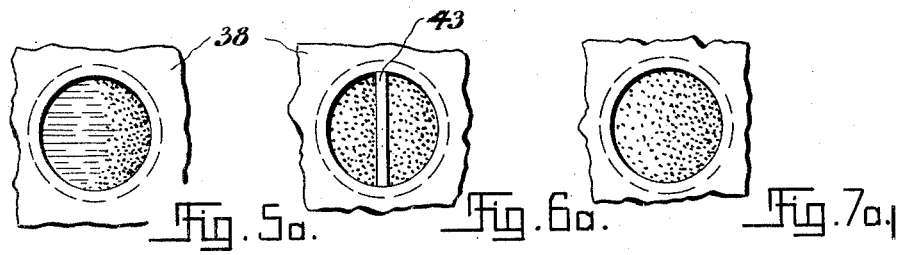
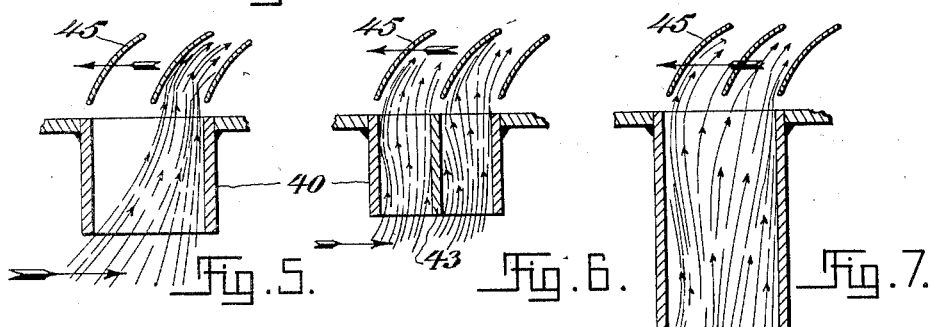
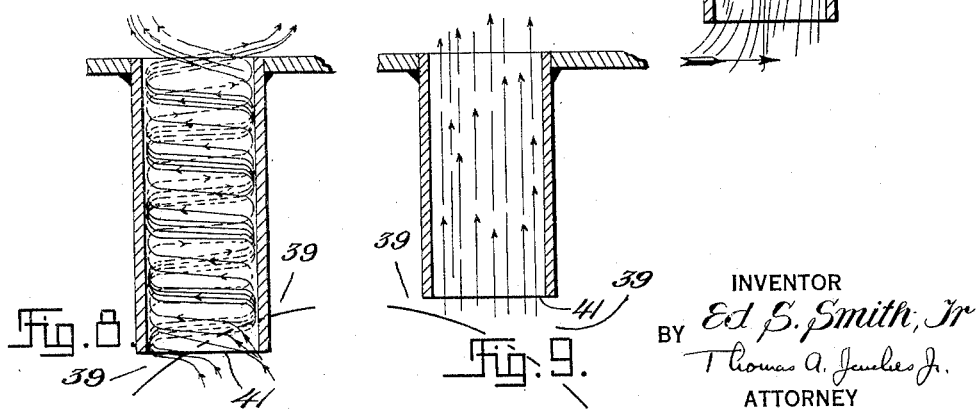
INVENTOR
BY Ed S. Smith, Jr
Thomas A. Jenckes Jr.
ATTORNEY Patented Feb. 23, 1932

1,846,225

UNITED STATES PATENT OFFICE

ED S. SMITH, JR., OF PROVIDENCE, RHODE ISLAND, ASSIGNOR TO BUILDERS IRON FOUNDRY, OF PROVIDENCE, RHODE ISLAND, A CORPORATION OF RHODE ISLAND

ROTARY LOW PRESSURE FLOW METER

Application filed January 7, 1929. Serial No. 330,735.

My invention relates to improvements in nozzle means for use in directing the flow onto a rotary turbine particularly in a rotary flow meter.

While my invention may be employed for use in any type of rotary flowmeter it is particularly adapted for use in the type of rotary flowmeter shown and described in the application of John Lawrence Hodgson for flow quantity meters, filed June 9, 1928, Ser. No. 284,094 of the type having a shunt line in which a turbine rotates attached to the main line.

An object of my invention is to so locate the nozzle means that the entrance thereto may be located out of the main flow stream through the main line and preferably in the entrance to the shunt line in the lee of the main line side wall. If the nozzle is made long enough to project into the main flow stream objectionable helical flow is produced throughout the nozzle.

I have found out that if short nozzles are employed it will result in an irregular torque on the turbine at low rates as the various blades pass the nozzles which will not produce the desired even rotation of the turbine for correct reading of the meter. I have found in practice that if the usual cylindrical nozzle is employed, the length of the nozzle should be at least twice its diameter. In the construction of flow means of this type it is impractical to employ such a long cylindrical nozzle for constructional reasons. In the steam heater field it has been necessary to develop low pressure meters as the system usually operates at substantially atmospheric pressure. With these low pressures the differential produced is proportionately low to avoid expansion errors. To obtain the necessary power from the turbine with this low differential it is essential that the nozzles have a much greater area so that a much greater flow impinges upon the turbine blades. For this reason, in the embodiment shown, I preferably employ four instead of two nozzles and for the same reason make the size of the nozzles as large as possible to give the desired area. As there is a minimum amount of head room a simple nozzle of the desired area and length cannot be employed.

My invention therefore relates to the provision of nozzles short enough to fit into the meter and which will direct the desired amount of flow against the turbine blades in an even manner. I have found in shortening the length of the nozzles that if I employ a longitudinal partition preferably located diametrically of each nozzle and also preferably radially of the turbine shaft, the length of the nozzle can be substantially halved and that this improved nozzle will give a substantially uniform distribution of flow in the desired parallel direction to the turbine blades since the stream will then expand to completely fill the nozzle.

A further object of my invention is to provide vertical radial fins in the shunt line above the turbine to prevent any slowing down of the turbine due to back wash of the exhaust steam from the turbine blades. These fins cooperate with the nozzles in maintaining the desired flow conditions in the stream which act upon the rotor.

It is also apparent that by minimizing the cross velocity at the entrance of the nozzles, by placing them in the lee of the main line side wall and by placing diametric partitions in each nozzle parallel to the axis of the turbine shaft, and finally by placing guide partitions above the turbine radially to the turbine shaft, that these will all cooperate to produce the desired type of flow upon the turbine blades; that is a uniformly distributed flow parallel to the axis of the turbine.

A further object of my invention is to provide an improved type of detachable nozzle plate for rotary flowmeters and an improved type of nozzle.

These and such other objects of my invention as may hereinafter appear will be best understood from a description of the accompanying drawings, which illustrate an embodiment thereof.

In the drawings, Fig. 1 is a side elevation of a rotary flowmeter employing the principles of my invention, portions thereof in the main and shunt lines being shown in section.

Fig. 4 is a perspective view of the nozzle plate with the attached nozzles I preferably employ.

Fig. 5 is a diagrammatic sectional view of a nozzle and turbine blades showing the flow through a short single nozzle and Fig. 5ª is a plan view diagrammatically illustrating the poor distribution of said flow through such a nozzle.

Fig. 6 is a diagrammatic sectional view of an improved nozzle and turbine blades showing the flow through a short nozzle equipped with my improved diametric partition and Fig. 6ª is a plan view diagrammatically illustrating the substantially uniform distribution of flow through the same.

Fig. 7 is a diagrammatic sectional view of a long simple nozzle wherein the length thereof is enough more than its diameter to achieve a satisfactorily uniform flow therethrough, and Fig. 7ª is a plan view showing diagrammatically the even distribution of such a flow.

Fig. 8 is a sectional view diagrammatically illustrating the helical flow produced if the entrance to the nozzle partially lies in the path of the flow stream.

Fig. 9 is a sectional view diagrammatically illustrating a substantially uniform parallel flow produced when the entrance of the nozzle lies out of the path of the main flow stream and has practically no velocity thereacross.

Figure 3:
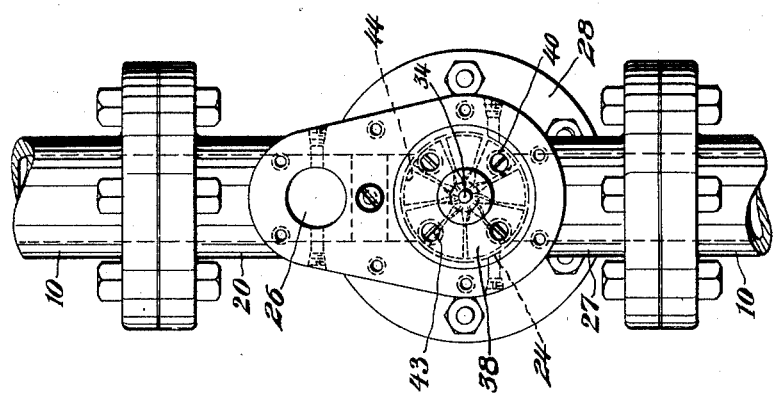
Fig. 3 is a plan view thereof with the top cover and turbine removed.

In the drawings, wherein like characters of reference indicate like parts throughout, 10 generally indicates a main conduit to which a shunt meter of the type described in the aforesaid application of John Lawrence Hodgson for a flow quantity meter is adapted to be attached, reference to which is hereby made for further details of said construction. Said shunt metering device comprises a pressure differential producing means 12, a pressure differential responsive mechanism 14 and indicating means 16 having replaceable sets of gearing therein. As shown in the drawings the pressure differential responsive mechanism 14 is attached to the shunt line across the main conduit 10. The metering device comprises the main metering line portion 20, a shunt line 22 connected thereto and a pressure differential responsive means 14 attached to said main line so as to have the turbine 44 thereof revolve within the shunt line and a pressure differential producing means 12 attached to the main line 20 between the inlet 24 and outlet 26 of the shunt line. The differential responsive mechanism includes a casing or main line side wall 27 attached to the conduit and a damper casing 28 attached to said casing. The turbine shaft 34 extends through the damper casing 28 and main casing 27. An obstruction or nozzle plate 38 extends across the conduit attachable casing 27 near the shunt inlet 24 having the turbine shaft 34 and preferably an even number, preferably four diametrically opposed nozzles 40 extending therethrough, which preferably consist of cylindrical nozzle tubes 40. The turbine 44 is attached to the shaft 34 downstream of said nozzle plate 38, in my preferred embodiment, within the shunt line 22 and preferably has an odd number of twisted blades 45. In order to produce the desired differential in the main line between the terminals of the shunt line, the obstruction 70 is provided in the main line between the terminals 24 and 26 of the shunt line. It is apparent that the orifice 12 which functions as the pressure differential producing means may consist of other forms than the chord orifice shown. So much of the shunt meter hereinbefore described is explained in more detail in the hereinbefore referred to application.

My invention specifically relates to the means I preferably employ to secure a uniform distribution of flow across the turbine.

Fig. 8 diagrammatically illustrates the result of making the nozzle 40 long enough to project into the main flow stream 10 as helical flow is produced through the nozzle giving a lack of turbine torque and a poor distribution at low rates of flow. To overcome this and as shown in the drawings I locate the entrances 41 to said nozzles 40 out of the way of the main flow stream through the main line 10. In my preferred embodiment I preferably locate them in the lee of the main line side wall 27. If the entrances 41 to the nozzles are out of the way of the flow of the main flow stream a substantially uniform flow will be produced as diagrammatically illustrated in Fig. 9.

My invention further relates to the method I employ of constructing the improved short nozzle, necessary for constructional purposes, of equal efficiency as a longer simple nozzle wherein the length thereof is more than twice its diameter to produce the desired type of flow, shown diagrammatically in Figs. 7 and 7ª. If, as shown in Figs. 5 and 5ª a short simple cylindrical nozzle be employed from a stream which has some velocity of flow at right angles to the nozzle, the unequal concentration of the flow is shown diagrammatically in Fig. 5ª with the stream flowing substantially entirely at one side of the nozzle and not filling it. I have discovered that if a partition, preferably a longitudinally extending partition 43, is inserted diametrically of the short nozzle, a substantially uniform distribution of flow will take place therethrough; a similar distribution to the flow achieved from the long nozzle shown in Fig. 7.

As shown in Fig. 4 the nozzle plate 38 is preferably inserted in the meter at the entrance to the shunt line 22 and as shown in Fig. 4 comprises the plate 38 having a plurality of radially evenly disposed holes 49 therein and the cylindrical nozzles 40 mounted within and projecting downwards from said holes 49. In my preferred embodiment, as just stated, said nozzles are preferably provided with the partitions 43 extending longitudinally thereof diametric of each nozzle and in my preferred embodiment also preferable radially of the nozzle plate center 47 and turbine shaft 34. It is thus obvious that the partition 43 cuts in half the effective diameter of the nozzle and enables the short nozzle 40 to really consist of two nozzles each having a length at least twice its substantial diameter.

Figure 2:
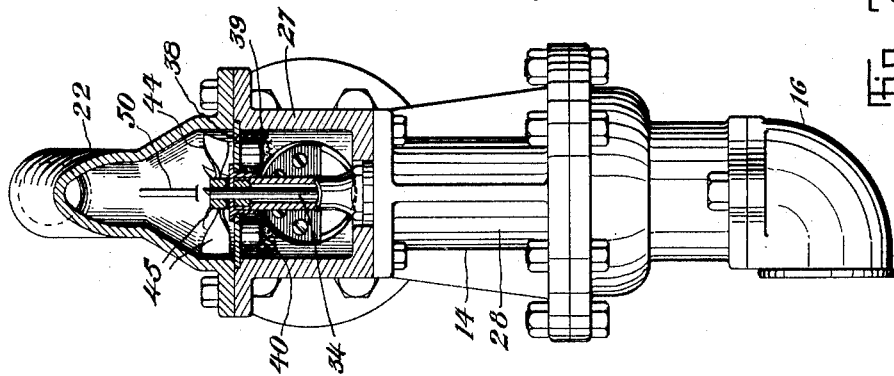
Fig. 2 is a cross sectional view of the upper portion of the metering device taken along the axis of the turbine shaft.
Figure 1:
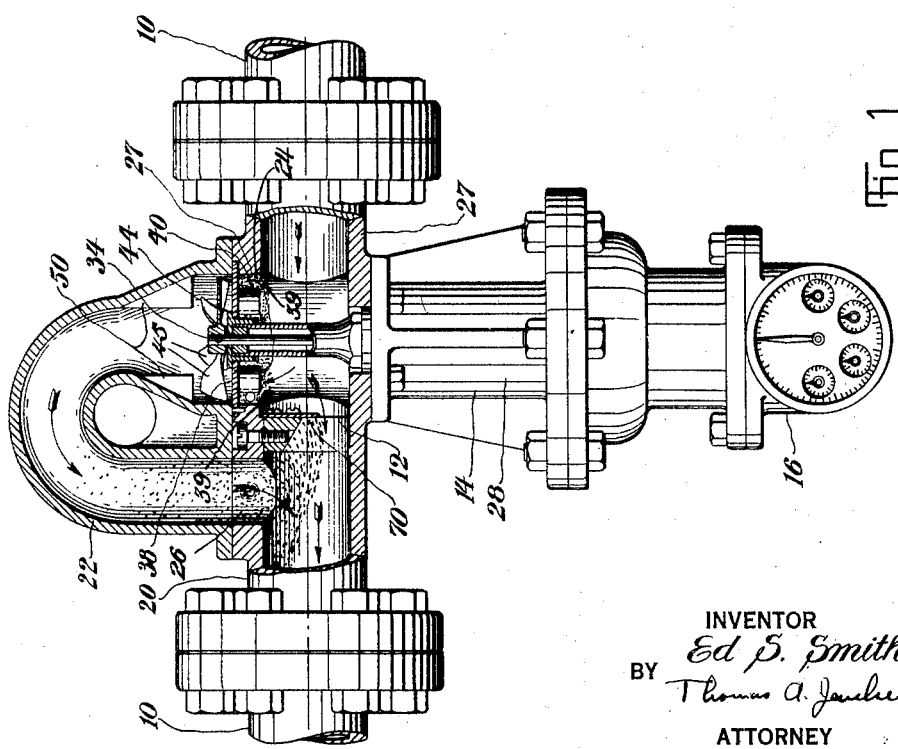

To further cooperate in providing a uniform flow across the turbine blades as shown in Figs. 2 and 3, I preferably provide the shunt line 22 immediately down stream of said turbine 44 with the axially extending inwardly projecting radial fins 50 for the purpose of maintaining a uniform flow therethrough and to substantially eliminate any backwash of the exhaust stream so that it does not swirl and drag upon the upper edges of the blades of the rotating turbine. As stated hitherto, these fins cooperate with my improved location of nozzles and my improved partitions in providing a substantially parallel axial uniform flow across the turbine blades.

It is understood that my invention is not limited to the specific embodiments shown and that various deviations may be made therefrom without departing from the spirit and scope of the appended claims.

What I claim is:

1. In a turbine flowmeter, a main line, a pressure differential producing means in said main line, a shunt line connected to said main line on opposite sides of said pressure differential producing means, a differential responsive mechanism comprising a turbine mounted within said shunt lint, indicating means, means connecting said turbine and in mounted within said shunt line, indicating means is actuated by said turbine and nozzle means interposed in said shunt line within the entrance thereof and out of the way of the main flow stream through the main line upstream of said turbine to impinge the flow at the desired angle on the turbine blades.

2. In a turbine flowmeter, a main line, a pressure differential producing means in said main line, a shunt line connected to said main line on opposite sides of said pressure differential producing means, a differential responsive mechanism comprising a turbine mounted within said shunt line, indicating means, means connecting said turbine and indicating means whereby said indicating means is actuated by said turbine and nozzle means interposed in said shunt line within the entrance thereof in the lee of the main line side wall upstream of said turbine to impinge the flow at the desired angle on the turbine blades.

3. In a turbine flowmeter, a main line, a pressure differential producing means in said main line, a shunt line connected at substantially right angles to said main line on opposite sides of said pressure differential producing means, a turbine shaft projecting diametrically across said main line and having blades attached to the end thereof within the shunt line, indicating means, means connecting said turbine and indicating means whereby said indicating means is actuated by said turbine shaft and a nozzle plate mounted across the entrance to said shunt line and having relatively short nozzles located radially thereof, projecting towards said main line and terminating within said shunt line entrance, whereby the shunt line and main line side wall may protect the entrances to said nozzles from the flow of the main stream.

4. In a turbine flowmeter, a main line, a pressure differential producing means in said main line, a shunt line connected at substantially right angles to said main line on opposite sides of said pressure differential producing means, a turbine shaft projecting diametrically across said main line and having blades attached to the end thereof within the shunt line, indicating means actuated by the other end of said turbine shaft and a nozzle plate mounted across the entrance to said shunt line and having relatively short nozzles located radially thereof, projecting towards said main line and terminating within said shunt line entrance and having longitudinal partitions mounted therein diametrically of each nozzle and radially of the turbine center, whereby the shunt line and main line side wall may protect the entrances to said nozzles from the flow of the main stream.

5. In a turbine flowmeter, a main line, a pressure differential producing means in said main line, a shunt line connected at substantially right angles to said main line on opposite sides of said pressure differential producing means, a turbine shaft projecting diametrically across said main line and having blades attached to the end thereof within the shunt line, indicating means actuated by the other end of said turbine shaft and a nozzle plate mounted across the entrance to said shunt line and having relatively short nozzles located radially thereof, projecting towards said main line and terminating within said shunt line entrance and having longitudinal partitions mounted therein, whereby the shunt line and main line side wall may protect the entrances to said nozzles from the flow of the main stream.

6. In a turbine flowmeter, a main line, a pressure differential producing means in said main line, a shunt line connected at substantially right angles to said main line on opposite sides of said pressure differential producing means, a turbine shaft projecting diametrically across said main line and having blades attached to the end thereof within the shunt line, indicating means actuated by the other end of said turbine shaft and a nozzle plate mounted across the entrance to said shunt line and having relatively short nozzles located radially thereof, projecting towards said main line and terminating within said shunt line entrance, whereby the shunt line and main line side wall may protect the entrances to said nozzles from the flow of the main stream, the length of said nozzles being at least twice their diameter.

7. In a turbine flowmeter, a main line, a pressure differential producing means in said main line, a shunt line connected at substantially right angles to said main line on opposite sides of said pressure differential producing means, a turbine shaft projecting diametrically across said main line and having blades attached to the end thereof within the shunt line, indicating means actuated by the other end of said turbine shaft and a nozzle plate mounted across the entrance to said shunt line and having relatively short nozzles located radially thereof, projecting towards said main line and terminating within said shunt line entrance and having longitudinal partitions mounted therein diametrically of each nozzle and radially of the turbine center, whereby the shunt line and main line side wall may protect the entrances to said nozzles from the flow of the main stream, the length of said nozzles being at least twice their diameter.

8. A nozzle plate for use in turbine flowmeters, said plate having a plurality of equally spaced holes therein, and cylindrical nozzles mounted within and projecting downwards from said holes, said nozzles having longitudinal partitions mounted therein diametrically of each nozzle and radially of the nozzle plate center, the length of said nozzles being at least twice their effective diameter.

9. A nozzle plate, for use in turbine flowmeters, said plate having a plurality of radially disposed holes therein and cylindrical nozzles mounted within and projecting downwards from said holes, said nozzles having longitudinal partitions mounted therein radially of the nozzle plate center.

10. A nozzle plate, for use in turbine flowmeters, said plate having a plurality of radially disposed holes therein and cylindrical nozzles mounted within and projecting downwards from said holes, said nozzles having longitudinal partitions mounted therein diametrically of each nozzle.

11. A nozzle plate, for use in turbine flowmeters, said plate having a plurality of radially disposed holes therein and cylindrical nozzles mounted within and projecting downwards from said holes, said nozzles having longitudinal partitions mounted therein diametrically of each nozzle and radially of the nozzle plate center.

12. In a turbine flow meter, a main line, a pressure differential producing means in said main line, a shunt line connected to said main line on opposite sides of said pressure differential producing means, a differential responsive mechanism comprising a turbine mounted within said shunt line, indicating means, means connecting said turbine and indicating means whereby said indicating means is actuated by said turbine and nozzle means interposed in said shunt line within the entrance thereof and out of the way of the main flow stream through the main line upstream of said turbine to impinge the flow at the desired angle on the turbine blades, and longitudinally extending inwardly projecting radial fins attached to said shunt line immediately downstream of said turbine.

13. In a turbine flowmeter, a main line, a pressure differential producing means in said main line, a shunt line connected to said main line on opposite sides of said pressure differential producing means, a differential responsive mechanism comprising a turbine mounted within said shunt line, indicating means, means connecting said turbine and indicating means whereby said indicating means is actuated by said turbine and nozzle means interposed in said shunt line within the entrance thereof and out of the way of the main flow stream through the main line upstream of said turbine to impinge the flow at the desired angle on the turbine blades and means in said shunt line immediately downstream of said turbine to aid in preventing back wash.

14. In a turbine flowmeter, a main line, a pressure differential producing means in said main line, a shunt line connected at substantially right angles to said main line on opposite sides of said pressure differential producing means, a turbine shaft projecting diametrically across said main line and having blades attached to the end thereof within the shunt line, indicating means actuated by the other end of said turbine shaft and a nozzle plate mounted across the entrance to said shunt line and having relatively short nozzles located radially thereof, projecting towards said main line and terminating within said shunt line entrance, whereby the shunt line and main line side wall may protect the entrances to said nozzles from the flow of the main stream and longitudinally extending upwardly projecting radial fins attached to said shunt line immediately down stream of said turbine.

In testimony whereof I affix my signature.

ED S. SMITH, Jr.

CERTIFICATE OF CORRECTION.

Patent No. 1,846,225.                                              February 23, 1932.

ED S. SMITH, JR.

It is hereby certified that error appears in the printed specification of the above numbered patent requiring correction as follows: Page 3, line 47, claim 1, beginning with the word "lint" strike out all to and including "line", in line 49, and insert instead "line, indicating means, means connecting said turbine and indicating means whereby said; and that the said Letters Patent should be read with this correction therein that the same may conform to the record of the case in the Patent Office.

Signed and sealed this 6th day of September, A. D. 1932.

M. J. Moore, (Seal)                                         Acting Commissioner of Patents.